(12) United States Patent
Glaser et al.

(10) Patent No.: US 7,703,092 B1
(45) Date of Patent: Apr. 20, 2010

(54) METHOD, SYSTEM, COMPUTER PROGRAM PRODUCT, AND ARTICLE OF MANUFACTURE FOR INSTALLATION AND CONFIGURATION OF A COMPUTER PROGRAM ACCORDING TO A STORED CONFIGURATION

(75) Inventors: Howard J. Glaser, San Jose, CA (US); Laurence E. England, Morgan Hill, CA (US); Rebecca Lau Poole, San Jose, CA (US); Chenhong Xia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 09/687,033

(22) Filed: Oct. 12, 2000

(51) Int. Cl.
*G06F 9/44* (2006.01)
*G06F 9/445* (2006.01)

(52) U.S. Cl. .................. 717/177; 717/121; 717/172

(58) Field of Classification Search ......... 717/168–178; 709/203–231
See application file for complete search history.

(56) References Cited

U.S. PATENT DOCUMENTS

| 4,995,609 | A | 2/1991 | Parente et al. |
| 5,183,255 | A | 2/1993 | Antonious |
| 5,230,510 | A | 7/1993 | Duclos |
| 5,324,033 | A | 6/1994 | Fenton, Jr. |
| 5,339,433 | A | 8/1994 | Frid-Nielsen ............... 395/700 |
| 5,377,978 | A | 1/1995 | Lee |
| 5,432,903 | A | 7/1995 | Frid-Nielsen ............... 395/161 |
| 5,530,749 | A | 6/1996 | Easter et al. .................. 380/3 |
| 5,530,753 | A | 6/1996 | Easter et al. .................. 380/4 |
| 5,550,976 | A | 8/1996 | Henderson et al. ...... 395/200.06 |
| 5,557,730 | A | 9/1996 | Frid-Nielsen ............... 395/159 |
| 5,581,749 | A | 12/1996 | Hossain et al. |
| 5,586,328 | A | 12/1996 | Caron et al. ................. 395/705 |
| 5,607,363 | A | 3/1997 | Chou |
| 5,611,043 | A | 3/1997 | Even et al. ............. 395/183.14 |
| 5,612,884 | A | 3/1997 | Haines ................... 364/464.13 |
| 5,626,528 | A | 5/1997 | Toulon |
| 5,642,417 | A | 6/1997 | Stringer |
| 5,643,105 | A | 7/1997 | Niswander |
| 5,673,390 | A | 9/1997 | Mueller ................... 395/185.1 |

(Continued)

OTHER PUBLICATIONS

Neves, Rich, *Groupware—Lotus Notes/Domino 5.0 Takes Groupware Battle to Next Level: Lotus*, Computer Reseller News, Dec. 21, 1998 p. 96 (1).

(Continued)

*Primary Examiner*—Chuck O Kendall
(74) *Attorney, Agent, or Firm*—Konrad Raynes & Victor LLP

(57) ABSTRACT

Remote installation of an application program is provided via a configuration of the application program corresponding to a particular user of the local application. The configuration is defined and stored on a remote server. In response to a user request, a determination is made that the stored configuration corresponds to the requesting user, the user is authenticated, and data is downloaded from the remote server according to the stored configuration. This stored configuration is also encrypted and stored in a manifest file which is also downloaded. Responsive to the user authentication, the manifest file is decrypted, and the application program is constructed pursuant to the configuration decrypted from the manifest file.

21 Claims, 4 Drawing Sheets

U.S. PATENT DOCUMENTS

| | | | | |
|---|---|---|---|---|
| 5,680,542 | A | 10/1997 | Mulchandani et al. | 395/183.04 |
| 5,740,444 | A | 4/1998 | Frid-Nielsen | 395/705 |
| 5,742,829 | A | 4/1998 | Davis et al. | |
| 5,850,517 | A | 12/1998 | Verkler et al. | 395/200.32 |
| 5,894,515 | A * | 4/1999 | Hsu | 713/193 |
| 5,894,571 | A | 4/1999 | O'Connor | 395/652 |
| 5,933,646 | A * | 8/1999 | Hendrickson et al. | 717/169 |
| 5,956,408 | A | 9/1999 | Arnold | 380/49 |
| 5,956,505 | A * | 9/1999 | Manduley | 713/1 |
| 5,982,899 | A | 11/1999 | Probst | 380/25 |
| 5,984,515 | A | 11/1999 | Mennemeier et al. | |
| 6,044,217 | A | 3/2000 | Brealey et al. | 395/701 |
| 6,052,531 | A * | 4/2000 | Waldin et al. | 717/170 |
| 6,058,264 | A | 5/2000 | Glaser | 395/702 |
| 6,061,517 | A | 5/2000 | House et al. | 395/704 |
| 6,064,977 | A | 5/2000 | Haverstock et al. | 705/9 |
| 6,069,627 | A | 5/2000 | Conrad et al. | 345/347 |
| 6,080,207 | A * | 6/2000 | Kroening et al. | 717/172 |
| 6,161,139 | A * | 12/2000 | Win et al. | 709/225 |
| 6,189,146 | B1 * | 2/2001 | Misra et al. | 717/177 |
| 6,205,476 | B1 * | 3/2001 | Hayes, Jr. | 709/220 |
| 6,226,618 | B1 * | 5/2001 | Downs et al. | 705/1 |
| 6,262,726 | B1 * | 7/2001 | Stedman et al. | 345/745 |
| 6,314,565 | B1 * | 11/2001 | Kenner et al. | 717/171 |
| 6,327,705 | B1 * | 12/2001 | Larsson et al. | 717/174 |
| 6,351,813 | B1 | 2/2002 | Mooney et al. | |
| 6,578,142 | B1 * | 6/2003 | Anderson et al. | 713/2 |
| 6,604,238 | B1 | 8/2003 | Lim et al. | |
| 6,918,113 | B2 * | 7/2005 | Patel et al. | 717/178 |
| 6,944,857 | B1 | 9/2005 | Glaser et al. | |
| 7,089,553 | B1 | 8/2006 | Glaser et al. | |

OTHER PUBLICATIONS

Gardner, Dana, *App Dev's next Chapter; Technologies Are Converging to Set off a Golden Era*, InfoWorld Mar. 1, 1999 v21 i9 p1 (1).

\* cited by examiner

METHOD, SYSTEM, COMPUTER PROGRAM PRODUCT, AND ARTICLE OF MANUFACTURE FOR INSTALLATION AND CONFIGURATION OF A COMPUTER PROGRAM ACCORDING TO A STORED CONFIGURATION

CROSS-REFERENCE TO RELATED APPLICATIONS

Application Ser. No. 09/687,414, filed concurrently herewith on Oct. 12, 2000 for METHOD, SYSTEM, COMPUTER PROGRAM PRODUCT, AND ARTICLE OF MANUFACTURE FOR DOWNLOADING A COMPUTER PROGRAM ACCORDING TO A STORED CONFIGURATION, currently co-pending, and assigned to the same assignee as the present invention; and Application Ser. No. 09/687,412, filed concurrently herewith on Oct. 12, 2000 for METHOD, SYSTEM, COMPUTER PROGRAM PRODUCT, AND ARTICLE OF MANUFACTURE FOR UPDATING A COMPUTER PROGRAM ACCORDING TO A STORED CONFIGURATION, currently co-pending, and assigned to the same assignee as the present invention.

The foregoing co-pending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to computer programs, and more particularly to remote installation of a computer program.

2. Description of the Related Art

Customers and providers may have a number of requirements in installing or deploying an application program.

Customers may prefer to remotely install application program clients from a central server(s) in order to increase both installation productivity and maintenance productivity. Thin clients may be preferred as thin clients generally require less workstation customization, perhaps as little as a browser with the appropriate option settings and plugins. Preferably, users should be able to move between different workstations, and still be able to access their tools and data, another potential advantage of a thin client. A customer may prefer to control which application programs and which versions of the application programs are available to a particular user. In addition to controlling the application programs, a customer may wish to control access to resources and assets based upon a user's responsibilities and roles in an organization. Alternatively, the customer may wish to control and filter project work views based on the user's responsibilities and roles. In addition to such central control, the customer may want an inventory of the application programs (including versions) installed and used on a workstation or a group of workstations without the need to go to each user workstation.

An application program provider may also have a number of similar requirements in installing or deploying an application program. The provider may also want for licensing purposes the inventory of the application programs (including versions) installed and used on a workstation or a group of workstations without the need to go to each user workstation. To satisfy a customer's specific individual requirements, the provider would prefer a mechanism for configuring the application program to support a customer solution which may be tailored by the customer to suit the customers needs, such as role-based views.

Conventional systems and methods have failed to provide all of the above advantages. Thus, there is a clearly felt need for a method, system, article of manufacture, and computer program product for providing remote installation and deployment with these advantages.

SUMMARY OF THE INVENTION

The present invention comprises a method, system, article of manufacture, and a computer program product for providing remote installation of an application program. A configuration of the application program corresponding to a particular user of the local application is defined and stored on a remote server. In response to a user request, a determination is made that the stored configuration corresponds to the requesting user, the user is authenticated, and data is downloaded from the remote server according to the stored configuration. This stored configuration is also encrypted and stored in a manifest file which is also downloaded. Responsive to the user authentication, the manifest file is decrypted, and the application program is constructed pursuant to the configuration decrypted from the manifest file.

One aspect of a preferred embodiment of the present invention defines a configuration of an application program corresponding to a particular user of the application program.

Another aspect of a preferred embodiment of the present invention stores the configuration on a remote server executing on a remote data processing system.

Another aspect of a preferred embodiment of the present invention initiates a session between the local data processing system and the remote data processing system in response to the user requesting the application program.

Another aspect of a preferred embodiment of the present invention authenticates the user in response to the user request.

Another aspect of a preferred embodiment of the present invention determines that the stored configuration corresponds to the requesting user.

Another aspect of a preferred embodiment of the present invention downloads data from the remote data processing system to the local data processing system according to the stored configuration.

Another aspect of a preferred embodiment of the present invention encrypts the stored configuration into a manifest file.

Another aspect of a preferred embodiment of the present invention downloads the manifest file from the remote data processing system to the local data processing system.

Another aspect of a preferred embodiment of the present invention authenticates the user in response to the user requesting a build of the application program.

Another aspect of a preferred embodiment of the present invention decrypts the manifest file in response to the user authentication.

Another aspect of a preferred embodiment of the present invention builds the application program pursuant to the configuration decrypted from the manifest file.

The present invention has the advantage of providing improved remote installation of a computer program.

The present invention has the further advantage of providing a remote install of an application program client from a central server(s) in order to increase installation productivity and maintenance productivity.

The present invention has the further advantage of providing thin clients which generally require less workstation customization.

The present invention has the further advantage of allowing a user to be able to move between different workstations, and still be able to access the user's tools and data.

The present invention has the further advantage of providing control over which application programs and which versions of the application programs are available to a particular user.

The present invention has the further advantage of providing control over access to resources and assets based upon a user's responsibilities and roles in an organization.

The present invention has the further advantage of providing control and filtering of project work views based on the user's responsibilities and roles.

The present invention has the further advantage of providing an inventory of the application programs (including versions) installed and used on a workstation or a group of workstations without the need to go to each user workstation.

The present invention has the further advantage of providing for licensing purposes the inventory of the application programs (including versions) installed and used on a workstation or a group of workstations without the need to go to each user workstation.

The present invention has the further advantage of allowing a user to configure the application program to support a customer solution which may be tailored by the customer to suit the customers needs, such as role-based views.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
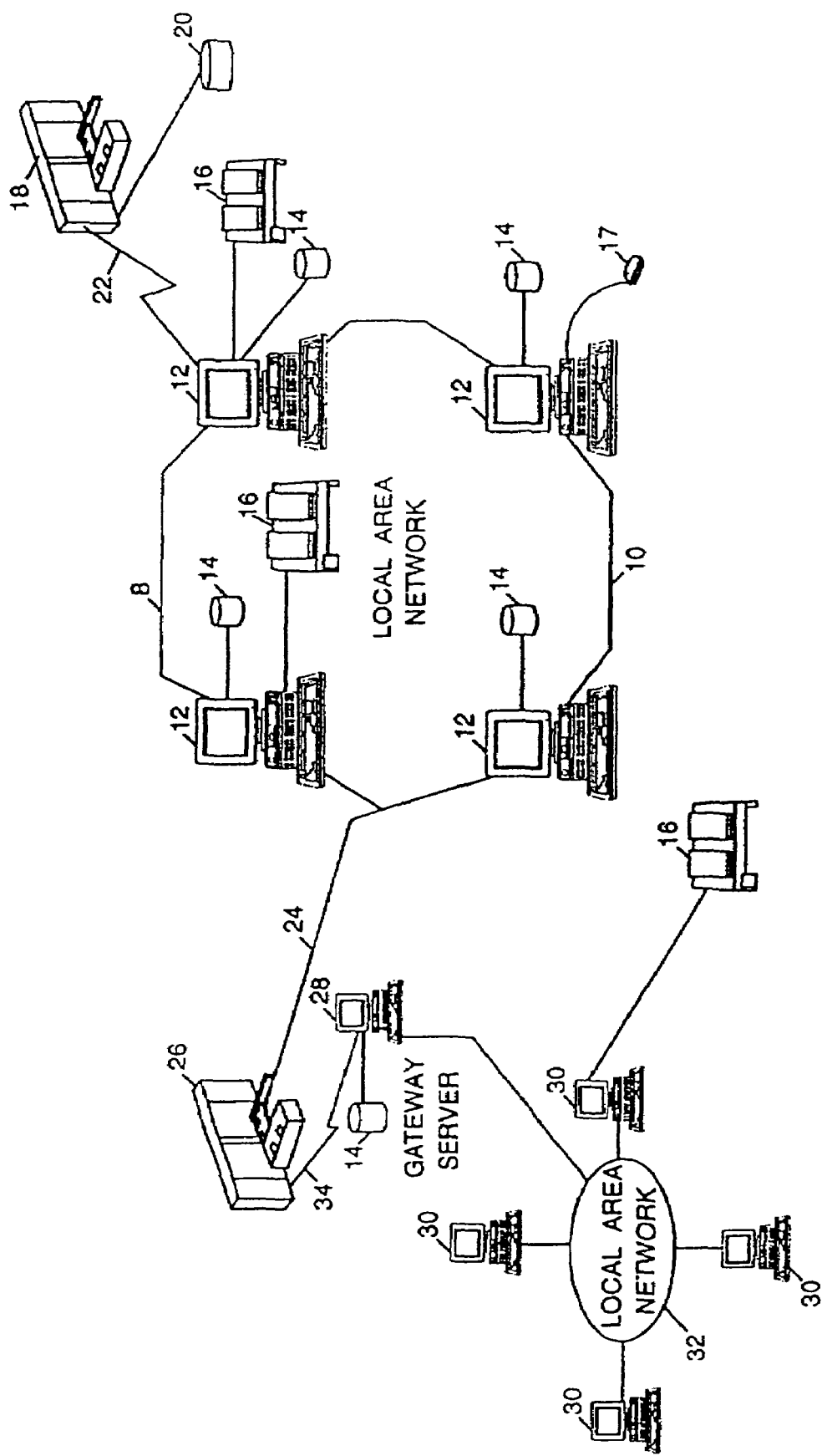
FIG. 1 is a block diagram of a distributed computer system used in performing the method of the present invention, forming part of the apparatus of the present invention, and which may use the computer program product and article of manufacture comprising a computer-readable storage medium having a computer program embodied in said medium which may cause the computer system to practice the present invention.

With reference now to the figures, and in particular with reference to FIG. 1, there is depicted a pictorial representation of a distributed computer system 8 which may be utilized to implement the method of, system for, article of manufacture, and computer program product of the present invention. As may be seen, distributed computer system 8 may include a plurality of networks 10 and 32, which may be Local Area Networks (LAN), intranet networks, or internet networks, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the present invention, to store the various computer programs which may be accessed and executed by a user within the distributed computer system 8, in accordance with the present invention. In a manner well known in the prior art, each such computer program may be stored within a storage device 14.

Still referring to FIG. 1, it may be seen that distributed computer system 8 may also include multiple mainframe computers, such as mainframe computer 18, which may be preferably coupled to Local Area Network 10 by means of communication link 22. Mainframe computer 18 may also be coupled to a storage device 20 which may serve as remote storage for Local Area Network 10 which may be coupled via communications controller 26 and communications link 34 to a gateway server 28. Gateway server 28 is preferably an individual computer or Intelligent Work Station which serves to link Local Area Network 32 to Local Area Network 10.

As discussed above with respect to Local Area Network 32 and Local Area Network 10, a plurality of server computer programs may be stored within storage device 20 and executed by mainframe computer 18. Similarly, a plurality of client computer programs may be stored within storage devices 14 and executed by individual computers 12 such that distributed client/server computer programs are provided. Of course, those skilled in the art will appreciate that the mainframe computer 18 may be located a great geographical distance from Local Area Network 10, and similarly, Local Area Network 10 may be located a substantial distance from Local Area Network 32. That is, Local Area Network 32 may be located in California while Local Area Network 10 may be located within Texas and mainframe computer 18 may be located in New York.

As will be appreciated upon reference to the foregoing, it is desirable for a user of a workstation 12 to be able to remotely install an application program from server 18. A configuration of the application program corresponding to this particular user of the application program is defined and stored on a remote storage 20 of the remote server 18. In response to a user request communicated from the user workstation 12 to the server 18 via LAN 10 and communications link 22, the server 18 determines that the configuration stored on storage 20 corresponds to the requesting user. Server 18 authenticates the user, and after such authentication, data is downloaded to the workstation 12 from the remote server 18 according to the stored configuration. This stored configuration is also encrypted and stored in a manifest file which is also downloaded. Responsive to the user authentication, the manifest file is decrypted, and the application program is constructed, configured, and installed on workstation 12 pursuant to the configuration decrypted from the manifest file. The user may also move from a first workstation 12 on which the application program is installed to a different second workstation 12 on LAN 10 and still be able to access the user's tools and data which may be downloaded and installed on the second workstation 12 in a similar fashion to the download and installation on the first workstation 12. Using the user configurations and authentications stored on storage 20 and the server 18, a customer may control the application programs, the versions of these application programs, and resources that are available to the particular user.

The customer may also inventory the application programs (including versions) installed and used on a workstation 12 or a group of workstations 12 on LAN 10 without the need to go to each user workstation. An application program provider may also want for licensing purposes such as inventory which may be produced by customer's server 18 or the provider's server 26.

Figure 2:
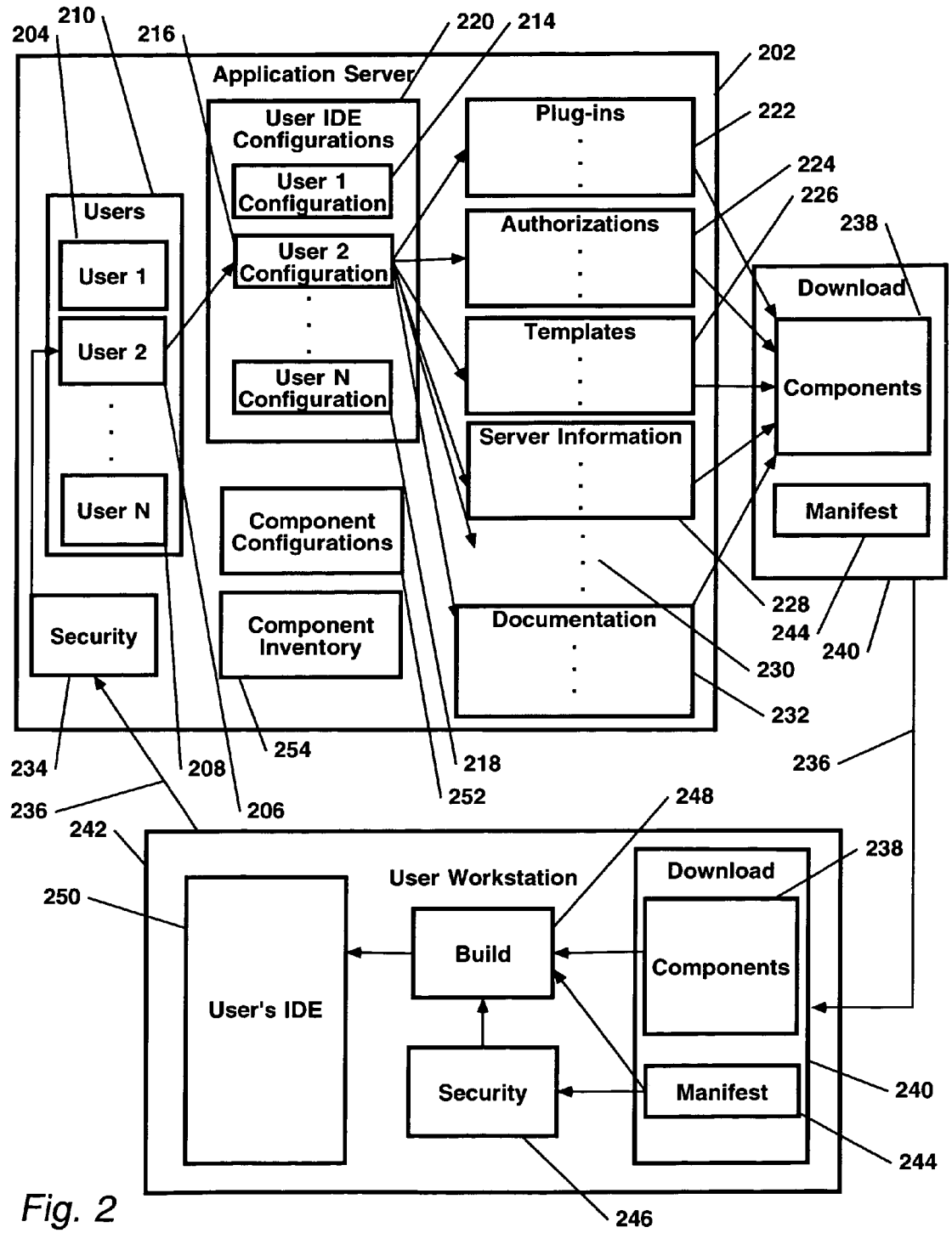
FIG. 2 is a block diagram of an application server and a user workstation preferred in carrying out a preferred embodiment of the present invention.

Referring now to FIG. 2, a block diagram of a preferred embodiment of the present invention is illustrated. A file known as a manifest file or manifest 244 provides a description as to which plugins, configurations, and other resources should be loaded when an application program, such as an Integrated Development Environment (IDE), is initialized. Although the preferred embodiment is presented in the context of an IDE, those skilled in the art will recognize that the invention may be practiced with other types of application programs. The preferred embodiment uses this manifest to provide a mechanism for plugging in tools or components to provide a customized application program with the appropriate viewers, editors, browsers, and other resources to support the user's needs. For example, a customized IDE may be provided with the appropriate viewers, editors, and browsers to support a specific developer's needs. Furthermore, the preferred embodiment allows remote customization and configuration of the application program for an individual user based on the user's role and responsibility in an organization.

The preferred embodiment of the present invention comprises an application server 202, which may be behind a web server, that is used to define users 204, 206, and 208 in a user table 210 and to define the users' application program configurations (214, 216, and 218) in a user IDE configuration table 220. This configuration may include plugins 222 to be downloaded, user authorizations for each user 224, templates for builds 226 (pre packaged site JCL), location/configuration of site servers 228, other information 230 such as the location and configuration of system input/output (I/O), and any site specific documentation 232 which may be shown in a browser or plugin.

A security system 234, such as a certificate or simple a logon dialog, may be used by a user to initiate a session 236 with the server 202. Upon authentication of the user by the security system 234, a table lookup of the user table 210 is performed and plugins 222, authorizations 224, templates 226, server information 228, and documentation 232 are aggregated into the user's components 238 which are downloaded via the download 240 to the user's workstation 242. In addition, a manifest 244 is created with this configuration information. This manifest 244 is encrypted and requires authentication from a security system 246 on the workstation 242 to be decrypted and used to build 248 an application program 250.

After the download 240 to the user's workstation 242, the user through a local logon in the security system 246 invokes the decryption and use of the manifest 244 to build 248 the user's personalized application program 250. Meanwhile a request may be sent, preferably unknown to the user, to the server 202 to check a component configuration table 252 maintained in the application server 202 to determine if any items have been updated. Alternatively, a request may be sent to the server 202 to record in a components inventory 254 which tools are being used by the user.

Figure 3:
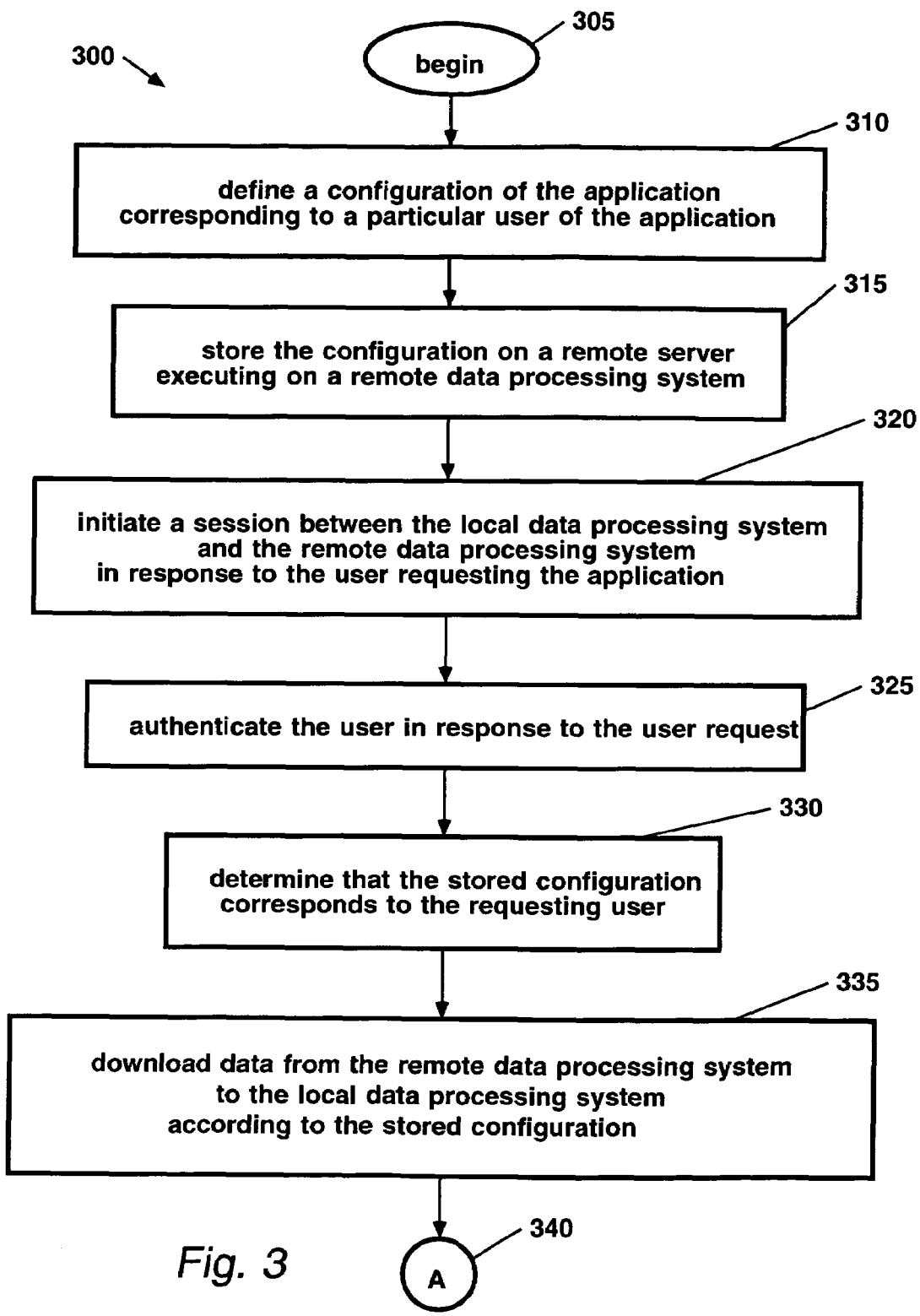
FIG. 3 and FIG. 4 are flowcharts of method steps preferred in carrying out a preferred embodiment of the present invention.
Figure 4:
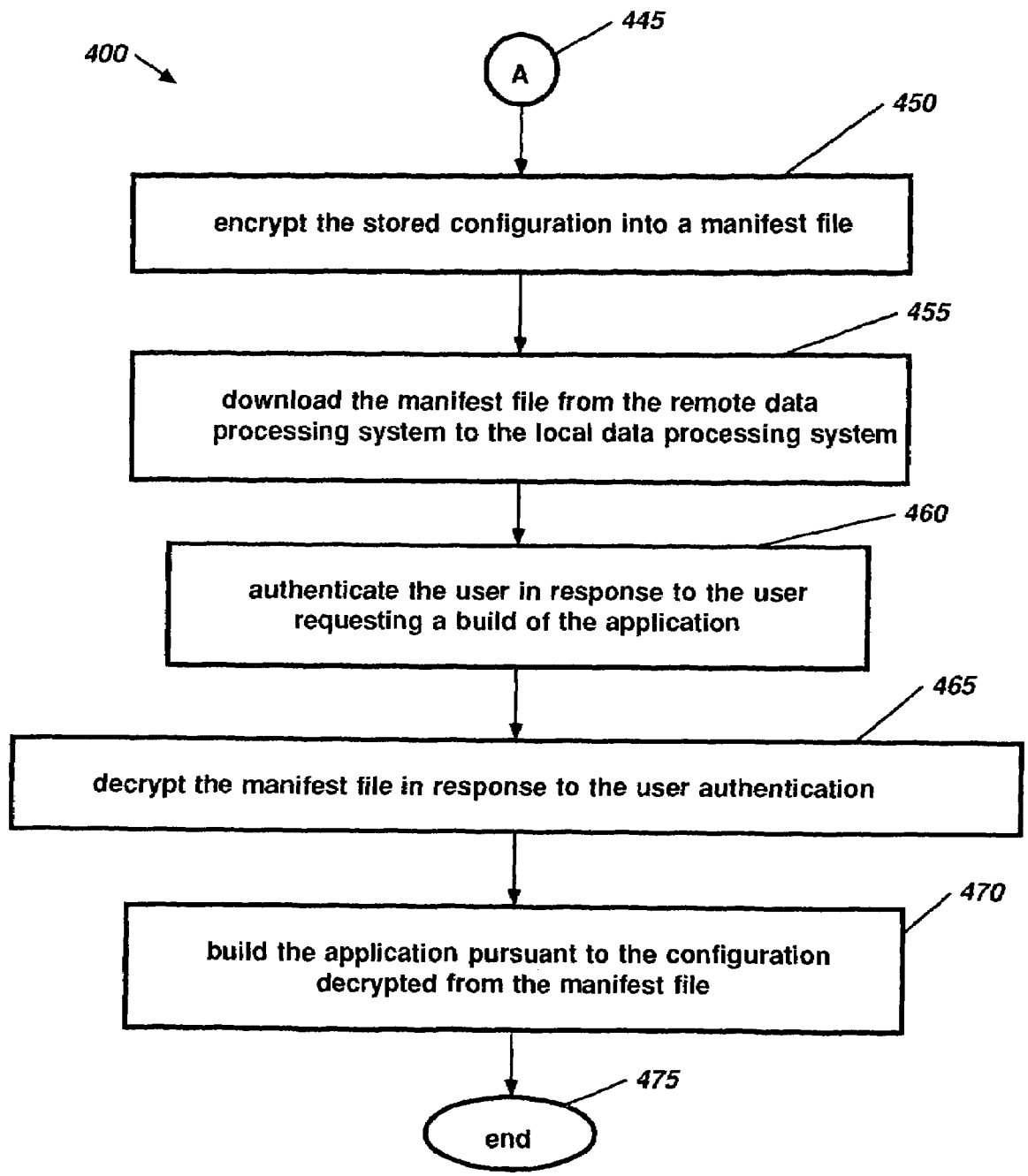

Referring now to FIGS. 3 and 4, the flowcharts 300 and 400 illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

After the start 305 of the process 300, process block 310 defines a configuration of the application corresponding to a particular user 206 of the application, such as user 2, and process block 315 then stores the configuration 216 on a remote server 202 executing on a remote data processing system 18. Alternatively, the configuration 216 may be stored on local data processing system 242. Thereafter, process block 320 may initiate a session between the local data processing system 242 and the application server 202 on remote data processing system 18 in response to the user 206 requesting the application. Responsive to this user request, process block 325 authenticates the user 206, and process block 330 then determines that the stored configuration 216 corresponds to the requesting user 206. Process block 335 then downloads data 240 from the remote data processing system 202 to the local data processing system 242 according to the stored configuration 216. Alternatively, process block 335 may access the data 240 from the local data processing system 242 or from another resource within the distributed computer system 8 according to the stored configuration 216. Thereafter, processing continues to decision block 450 on FIG. 4. This processing path is illustrated by flowchart connectors A, 340 on FIG. 3 and 445 on FIG. 4. Process block 450 encrypts the stored configuration 216 into a manifest file 244 which is then downloaded by process block 455 from the remote data processing system 202 to the local data processing system 242. Alternatively, process block 450 may encrypt the stored configuration 216 into a manifest file 244 which is then stored on the local data processing system 242. After the download 240 of the manifest file 244 and the components 238 to the user workstation 242, the user 206 may request a build 248 of the downloaded components 238 pursuant to the configuration in the manifest file 244. Responsive to such a user request, the user is authenticated by process block 460, and if the user 206 is authenticated, then process block 465 decrypts the manifest file 244. Thereafter, process block 470 builds, installs, and configures the application program 250 pursuant to the configuration decrypted from the manifest file 244. The process then ends at process block 475.

In an alternative embodiment of the present invention, an application program is updated for execution on the data processing system. In this alternative embodiment, process block 330 also determines if any items described in the configuration have been updated. If an item has been updated, then process block 335 retrieves the updated item, and process block 470 builds the application program with the updated item.

In still another alternative embodiment of the present invention, an application program is updated for execution on the data processing system based upon determining if any items described in the decrypted configuration have been updated. In this alternative embodiment, process block 465 also determines if any items described in the decrypted configuration have been updated. If an item has been updated, then process block 470 retrieves the updated item and builds the application program with the updated item.

Using the foregoing specification, the invention may be implemented using standard programming and/or engineering techniques using computer programming software, fireware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, severs, input/output (I/O) devices, or any sub-components or individual parts of one or more processing systems, including software, firmware, hardware or any combination or sub-combination thereof, which embody the invention as set forth in the claims. User input may be received from the keyboard, mouse, pen, voice, touch screen, or any other means by which a human can input data to a computer, including through other programs such as application programs, databases, data sets, or files.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. A method of installing an application program for execution on a data processing system, said method comprising:
defining a user configuration of the application program installation corresponding to a particular user of the application program installed on a first data processing system;
encrypting and storing the user application program installation configuration in a manifest file;
determining that the stored user application program installation configuration corresponds to the particular user;
authenticating the particular user in response to the particular user requesting the application program for installation on a second data processing system;
decrypting the manifest file in response to the user authentication; and
building the application program on the second data processing system in a configuration customized to conform to the user application program installation configuration decrypted from the manifest file.

2. The method of claim 1 wherein the second data processing system is a local data processing system and further comprising:
storing the user application program installation configuration on a remote server executing on a remote data processing system;
initiating a session between the local data processing system and the remote data processing system in response to the particular user requesting the local application program;
responsive to the user authentication, downloading data from the remote data processing system to the local data processing system according to the stored user application program installation configuration; and
downloading the manifest file from the remote data processing system to the local data processing system.

3. The method of claim 2 further comprising:
authenticating the particular user in a second authentication responsive to the particular user requesting a build of the application program;
decrypting the manifest file responsive to the second authentication; and
building the application program pursuant to the user application program installation configuration decrypted from the manifest file responsive to the second authentication.

4. The method of claim 1 further comprising:
recording a description of items that are being used by the particular user.

5. The method of claim 4 wherein the recorded description is used for administering licensing of the items.

6. The method of claim 2 wherein the remote server is a web server.

7. The method of claim 1 wherein the user application program installation configuration comprises data describing the particular user, the particular user's application program user configuration, and resources for which the particular user is authorized.

8. An article of manufacture for use in a data processing system for installing an application program for execution on the data processing system, said article of manufacture comprising a computer-readable storage medium having a computer program embodied in said medium which causes the data processing system to execute method steps comprising:
defining a user configuration of the application program installation corresponding to a particular user of the application program installed on a first data processing system;
encrypting and storing the user application program installation configuration in a manifest file;
determining that the stored user application program installation configuration corresponds to the particular user;
authenticating the particular user in response to the particular user requesting the application program for installation on a second data processing system;
decrypting the manifest file in response to the user authentication; and building the application program on the second data processing system in a configuration customized to conform to the user application program installation configuration decrypted from the manifest file.

9. The article of manufacture of claim 8 wherein the second data processing system is a local data processing system, and wherein the computer program embodied in said medium causes the data processing system to execute the additional method steps comprising:

storing the user application program installation configuration on a remote server executing on a remote data processing system;

initiating a session between the local data processing system and the remote data processing system in response to the particular user requesting the local application program;

responsive to the user authentication, downloading data from the remote data processing system to the local data processing system according to the stored user application program installation configuration; and downloading the manifest file from the remote data processing system to the local data processing system.

10. The article of manufacture of claim 9 wherein the computer program embodied in said medium causes the data processing system to execute the additional method steps comprising:

authenticating the particular user in a second authentication responsive to the particular user requesting a build of the application program;

decrypting the manifest file responsive to the second authentication; and building the application program pursuant to the user application program installation configuration decrypted from the manifest file responsive to the second authentication.

11. The article of manufacture of claim 8 wherein the computer program embodied in said medium causes the data processing system to execute the additional method step comprising:

recording a description of items that are being used by the particular user.

12. The article of manufacture of claim 11 wherein the recorded description is used for administering licensing of the items.

13. The article of manufacture of claim 9 wherein the remote server is a web server.

14. The article of manufacture of claim 8 wherein the user application program installation configuration comprises data describing the particular user, the particular user's application program user configuration, and resources for which the particular user is authorized.

15. A computer system including a first data processing system and a second data processing system, for installing an application program previously installed on the first data processing system, for execution on the second data processing system, said computer system comprising:

at least one processor; and at least one computer readable storage medium having stored on one or more of the computer readable storage media:

a manifest file comprising an encrypted user application program installation configuration in which said configuration is a user configuration of the application program installation on the first data processing system corresponding to a particular user of the application program; and code executed by one or more processors of the computer system to perform operations, the operations comprising:

determining that the stored user application program installation configuration corresponds to the particular user;

authenticating the particular user in response to the particular user requesting the application program for installation on the second data processing system;

decrypting the manifest file in response to the user authentication; and building the application on the second data processing system in a configuration customized to conform to the user application program installation configuration decrypted from the manifest file.

16. The computer system of claim 15 wherein the second data processing system is a local data processing system, said computer system further comprising:

a remote data processing system having a remote server executing on the remote data processing system and a computer readable storage medium in which the user application program installation configuration is stored;

wherein the operations further comprise:

conducting a session between the local data processing system and the remote data processing system in response to the particular user requesting the local application program; and responsive to the user authentication, downloading data from the remote data processing system to the local data processing system according to the stored user application program installation configuration wherein the downloaded data includes the manifest file which is downloaded from the remote data processing system to the local data processing system.

17. The computer system of claim 16 wherein the authenticating includes a second authentication of the particular user responsive to the particular user requesting a build of the application program;

wherein the decrypting includes decrypting the manifest file responsive to the second authentication; and wherein the building the application program pursuant to the user application program installation configuration decrypted from the manifest file is responsive to the second authentication.

18. The computer system of claim 15 wherein the operations further comprise recording a description of items that are being used by the particular user.

19. The computer system of claim 18 wherein a computer readable storage medium of the computer systems has a recorded description which is used for administering licensing of the items.

20. The computer system of claim 16 wherein the remote server is a web server.

21. The computer system of claim 15 wherein the user application program installation configuration comprises data describing the particular user, the particular user's application program user configuration, and resources for which the particular user is authorized.

* * * * *